US011181632B2

(12) United States Patent
Shtrom

(10) Patent No.: US 11,181,632 B2
(45) Date of Patent: Nov. 23, 2021

(54) PASSIVE RADAR IDENTIFICATION DEVICE

(71) Applicant: Augmented Radar Imaging, Inc., Los Altos, CA (US)

(72) Inventor: Victor Shtrom, Los Altos, CA (US)

(73) Assignee: Augmented Radar Imaging, Inc., Los Altos, CA (US)

( * ) Notice: Subject to any disclaimer, the term of this patent is extended or adjusted under 35 U.S.C. 154(b) by 267 days.

(21) Appl. No.: 16/378,545

(22) Filed: Apr. 8, 2019

(65) Prior Publication Data

US 2020/0319328 A1   Oct. 8, 2020

(51) Int. Cl.
| | | |
|---|---|---|
| *G01S 13/75* | (2006.01) | |
| *H01Q 17/00* | (2006.01) | |
| *H01Q 15/14* | (2006.01) | |
| *H01Q 3/26* | (2006.01) | |
| *G01S 13/00* | (2006.01) | |

(52) U.S. Cl.
CPC ........... *G01S 13/758* (2013.01); *H01Q 15/14* (2013.01); *H01Q 17/00* (2013.01)

(58) Field of Classification Search
CPC ..... G01S 13/758; G01S 13/756; H01Q 17/00; H01Q 15/14; H01Q 3/2647
See application file for complete search history.

(56) References Cited

U.S. PATENT DOCUMENTS

| | | | | | |
|---|---|---|---|---|---|
| 2,956,117 | A | * | 10/1960 | Ernst | B61L 25/04 348/148 |
| 3,247,509 | A | * | 4/1966 | Hamann | G01S 13/751 342/44 |
| 3,247,514 | A | * | 4/1966 | Hamann | B61L 25/04 342/44 |
| 3,521,280 | A | * | 7/1970 | Perkins | G06K 19/0672 342/44 |
| 3,691,557 | A | * | 9/1972 | Constant | G01S 13/753 342/25 F |
| 3,774,205 | A | * | 11/1973 | Smith | G01S 13/753 342/44 |
| 4,001,822 | A | * | 1/1977 | Sterzer | G01S 13/756 342/44 |
| 4,117,481 | A | * | 9/1978 | Constant | G01S 13/753 342/44 |

(Continued)

OTHER PUBLICATIONS

Internation Search Report and Written Opinion, PCT/US20/26793, dated Feb. 5, 2021.

*Primary Examiner* — Bernarr E Gregory
(74) *Attorney, Agent, or Firm* — Steven Stupp

(57) ABSTRACT

An identification device that provides identification information is described. This identification device includes a set of radar reflectors that reflect radar signals having a fundamental wavelength. The set of radar reflectors may be arranged in a pattern corresponding to the identification information. For example, the set of radar reflectors may be passive and retrodirective, where a given radar reflector reflects a radar signal back along its prior direction of propagation. Moreover, the pattern may include regions that reflect the radar signals and second regions that do not reflect or scatter the radar signals. During operation, the identification device may receive the radar signals, and then may selectively reflecting the radar signals using the set of radar reflectors to provide the identification information.

20 Claims, 7 Drawing Sheets

(56) References Cited

U.S. PATENT DOCUMENTS

| | | | | |
|---|---|---|---|---|
| 4,314,249 | A * | 2/1982 | Onoe | G01S 13/756 343/18 D |
| 6,529,154 | B1 | 5/2003 | Schramm | |
| 7,956,796 | B2 * | 6/2011 | Hyodo | G01S 13/88 342/46 |
| 7,969,281 | B2 * | 6/2011 | Kofman | G01S 13/751 340/10.1 |
| 2009/0014520 | A1 | 1/2009 | Kofman | |
| 2011/0084814 | A1 | 4/2011 | Ramsch | |
| 2015/0379314 | A1 | 12/2015 | Schreiber | |
| 2016/0054440 | A1 | 2/2016 | Younis | |
| 2017/0047663 | A1 * | 2/2017 | Hall | G01S 7/38 |
| 2017/0254898 | A1 * | 9/2017 | Park | G01S 13/584 |

* cited by examiner

PASSIVE RADAR IDENTIFICATION DEVICE

BACKGROUND

Field

The described embodiments relate to an identification device with a set of radar reflectors (such as retrodirective antennas) arranged in a pattern corresponding to identification information.

Related Art

Electromagnetic waves in a radio frequency band (which is henceforth referred to as 'radar') can be used to determine information about one or more objects in an environment. For example, continuous or pulsed radar signals having a fundamental wavelength in the radio frequency band may be transmitted, and reflected radar signals from an object may be received. These reflected radar signals may be analyzed to determine the information, such as a range, an angle and/or a velocity of the object.

In order to facilitate tracking and to prevent friendly fire incidents, many civilian and military aircraft include radar-based identification systems. For example, in identification friend or foe (IFF), a transponder listens from an incoming interrogation signal and then, in response, sends a unique response signal that identifies the broadcaster. Similarly, in the air traffic control radar beacon system (ATCRBS), a transponder in an aircraft responds to an incoming radar signal from a ground-based antenna with a return signal that conveys identification information about the aircraft.

However, many existing radar-based identification systems, such as IFF and ATCRBS, are active systems, in which a transponder broadcasts or transmits a response signal. While this approach can improve the speed and robustness of identification (such as at long range and in a variety of environmental conditions), it often increases the complexity, power consumption and cost of these radar-based identification systems.

SUMMARY

An identification device that provides identification information is described. This identification device may include a set of radar reflectors that reflect radar signals having a fundamental wavelength. The set of radar reflectors may be arranged in a pattern corresponding to the identification information. Moreover, the set of radar reflectors may be retrodirective, where a given radar reflector reflects a radar signal back along its prior direction of propagation. Furthermore, the pattern may include regions that reflect the radar signals and second regions that do not reflect or scatter the radar signals.

For example, the set of radar reflectors may include passive antennas.

Moreover, the regions may include radar reflectors in the set of radar reflectors and the second regions may exclude the radar reflectors. Alternatively or additionally, the regions may include radar reflectors in the set of radar reflectors and the second regions may include radar absorbers and/or may be coupled to ground.

Note that in some embodiments the second regions do scatter the radar signals. For example, the second regions may include radar scatterers.

In some embodiments, the regions may include radar reflectors in the set of radar reflectors and second regions include may radar reflectors in a second set of radar reflectors. The second set of radar reflectors may reflect radar signals having a second fundamental wavelength that is different from the fundamental wavelength. For example, the second set of radar reflectors may include a material that detunes the second fundamental wavelength from the fundamental wavelength. Notably, the material may change an impedance of the second set of radar reflectors.

Furthermore, the pattern may be one dimensional (e.g., the set of radar reflectors may be arranged along a line) or two dimensional (e.g., the set of radar reflectors may be arranged in a plane).

Additionally, the identification device may include a control circuit that provides electrical signals to the set of radar reflectors that dynamically configure the pattern. In some embodiments, the identification device may include: an antenna; and an interface circuit that wirelessly communicates with another electronic device. During operation, the identification device may: receive, via the interface circuit and the antenna, information that specifies the pattern; and provide the pattern to the control circuit.

Note that in some embodiments the pattern may be static.

Another embodiment provides a container or a vehicle that includes the identification device.

Another embodiment provides a method for providing identification information. During the method, an identification device may receive radar signals having a fundamental wavelength. Then, the identification device may selectively reflect the radar signals using a set of radar reflectors arranged in a pattern corresponding to the identification information. The set of radar reflectors may be retrodirective, where a given radar reflector reflects a radar signal back along its prior direction of propagation. Moreover, the pattern may include regions that reflect the radar signals and second regions that do not reflect or scatter the radar signals.

This Summary is provided for purposes of illustrating some exemplary embodiments, so as to provide a basic understanding of some aspects of the subject matter described herein. Accordingly, it will be appreciated that the above-described features are examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE FIGURES

Note that like reference numerals refer to corresponding parts throughout the drawings. Moreover, multiple instances of the same part are designated by a common prefix separated from an instance number by a dash.

DETAILED DESCRIPTION

Figure 1:
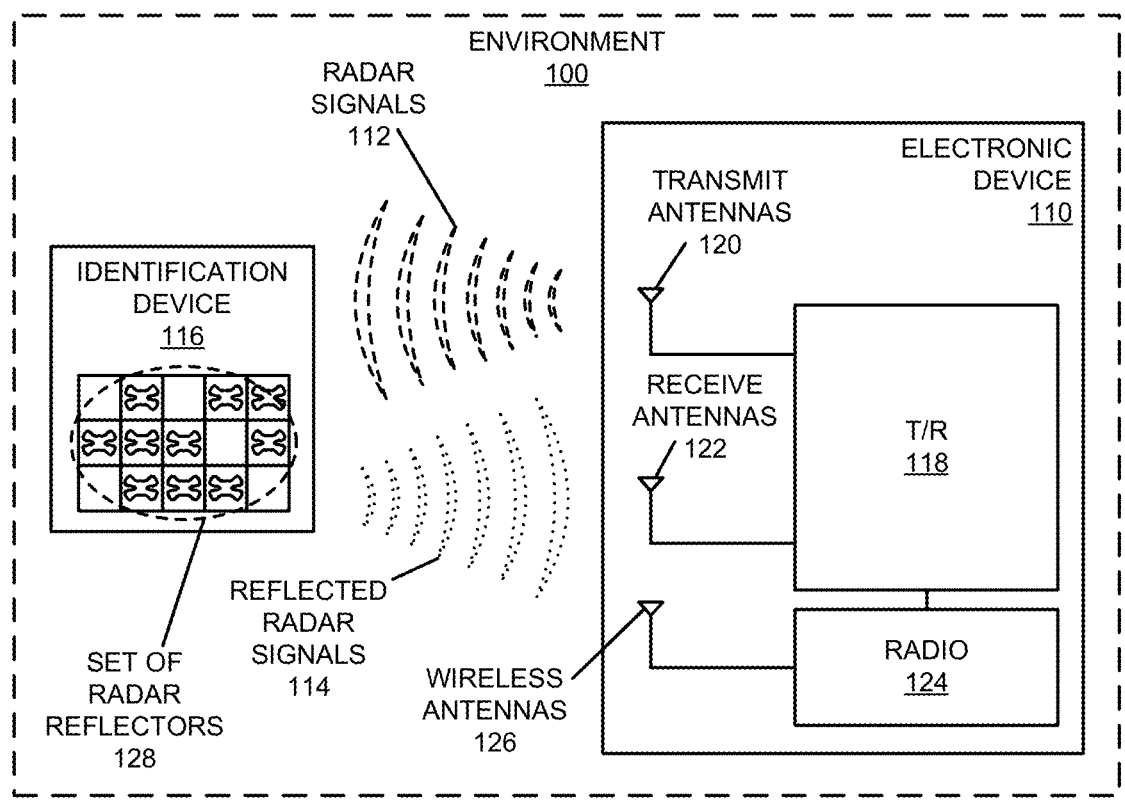
FIG. 1 is a drawing illustrating an example of an environment that includes an electronic device and an identification device in accordance with an embodiment of the present disclosure.

An identification device that provides identification information is described. This identification device includes a set of radar reflectors that reflect radar signals having a fundamental wavelength. The set of radar reflectors may be arranged in a pattern corresponding to the identification information. For example, the set of radar reflectors may be passive and retrodirective, where a given radar reflector reflects a radar signal back along its prior direction of propagation. Moreover, the pattern may include regions that reflect the radar signals and second regions that do not reflect or scatter the radar signals. During operation, the identification device may receive the radar signals, and then may selectively reflecting the radar signals using the set of radar reflectors to provide the identification information.

By providing spatially modulated reflected radar signals corresponding to the pattern, the identification device can provide the identification information. Moreover, because the identification information is provided passively, the identification device may have reduced size, complexity, power consumption and/or cost relative to existing radar-based identification systems. Consequently, the identification device may expand the types of applications in which radar-based identification can be used.

In the discussion that follows, radar is used as an illustrative example of the identification technique. For example, the radar may involve radar signals having a fundamental or carrier frequency of 24 GHz, 77-81 GHz or 140 GHz (which corresponds to the fundamental or carrier wavelength of 0.01249 m, 3.8934-3.7011 mm or 2.1414 mm), and/or another electromagnetic signal having a fundamental frequency in the radio or microwave frequency band. Moreover, the radar signals may be continuous wave and/or pulsed, may modulated (such as using frequency modulation or pulse modulation) and/or may be polarized. In particular, the radar signals may be frequency-modulated continuous-wave, pulse-modulated continuous-wave, multiple-input multiple-output (MIMO), etc. However, a wide variety of signals may be used in conjunction with or to implement the identification technique, either instead of or in addition to the radar signals. For example, the signals may include: electromagnetic waves or light in the visible spectrum or a visible frequency band (such as at least a frequency between 430 and 770 THz or at least a wavelength between 390 and 700 nm), infrared signals, sonar signals, etc. In some embodiments, the signals used in conjunction with or to implement the identification technique may include Lidar.

Moreover, in the discussion that follows, an electronic device that provides and receives radar signals may communicate using one or more of a wide variety of communication protocols. For example, the communication may involve wired and/or wireless communication. Consequently, the communication protocols may include: an Institute of Electrical and Electronics Engineers (IEEE) 802.11 standard (which is sometimes referred to as 'Wi-Fi®,' from the Wi-Fi Alliance of Austin, Tex.), Bluetooth® (from the Bluetooth Special Interest Group of Kirkland, Wash.), another type of wireless interface (such as another wireless-local-area-network interface), a cellular-telephone communication protocol (e.g., a 3G/4G/5G communication protocol, such as UMTS, LTE), an IEEE 802.3 standard (which is sometimes referred to as 'Ethernet'), another communication protocol, etc.

We now describe some embodiments of an identification technique. FIG. 1 presents a drawing illustrating an example of an environment 100 that includes an electronic device 110. This electronic device may transmit radar signals 112 having a fundamental wavelength (such as a wavelength in a radio frequency band), and may receive reflected radar signals 114 having the fundamental wavelength from one or more objects in environment 100, such as identification device 116. For example, electronic device 110 may include one or more transmitters in one or more transceivers (T/R) 118 that provided electrical signals to one or more transmit antennas 120, which radiate the corresponding radar signals 112. Moreover, reflected radar signals 114 may be received by one or more receive antennas 122, which provide corresponding electrical signals to one or more receivers in the one or more transceivers 118.

While separate transmit antennas 120 and receive antennas 122 are illustrated in FIG. 1, in some embodiments at least some antennas may be shared between transmit and receive operations (i.e., duplex operation). Moreover, in some embodiments, electronic device 110 may use a multiple-input multiple-output (MIMO) operating mode. Notably, the one or more transmitters 120 may concurrently output electrical signals to transmit antennas 120. These electrical signals may be encoded by the one or more transmitters in the one or more transceivers 118 so that they are orthogonal to each other. Moreover, the one or more receivers in the one or more transceivers 118 may concurrently receive the electrical signals corresponding to reflected radar signals 114 from receive antennas 122. Furthermore, during analysis of the received electronic signals, electronic device 110 may use pairs of transmit antennas 120 and receive antennas 122 (or, equivalently, pairs of electrical signals corresponding to pairs of transmit antennas 120 and receive antennas 122) to create a virtual antenna array with virtual antennas, where a given pair may include or correspond to a given transmit antenna and a given receive antenna. For example, if there are M transmit antennas 120 and N receive antennas 122 (where M and N are non-zero integers), then there may be M×N pairs in the analysis of the received electrical signals. In the process, the virtual antenna array may effectively have an increased number of virtual antennas (relative to the number of transmit antennas 120 and receive antennas 122). Stated differently, the virtual antenna array may have a larger or an increased aperture. Consequently, the virtual antenna array may have an enhanced spatial resolution relative to a spatial resolution corresponding to the separations between adjacent transmit antennas 120 and/or adjacent receive antennas 122.

As noted previously, it can be difficult to identify objects in environment 100 without using an active transponder. In order to address this challenge, identification device 116 may facilitate passive reflection of radar signals 114 with a spatial modulation that conveys identification information. As discussed further below with reference to FIG. 5, this identification information may be used to identify and/or facilitate tracking of an object in environment 100, such as a shipping container (which is sometimes referred to as a 'container').

Notably, as described further below with reference to FIGS. 2-4, identification device 116 may include a set of radar reflectors 128 that reflect radar signals 114 having the fundamental wavelength. The set of radar reflectors 128 may be arranged in a pattern corresponding to the identification information. Moreover, the set of radar reflectors 128 may be retrodirective, where a given radar reflector reflects a radar signal (such as one of radar signals 112) back along its prior direction of propagation (e.g., towards electronic device 110). Furthermore, the pattern may include regions that reflect radar signals 112 and second regions that do not reflect or scatter radar signals 112. This varying pattern of reflection may provide the spatial modulation in reflected radar signals 114 that conveys the identification information. For example, reflected radar signals 114 from the regions that reflect radar signals 112 may convey or correspond to binary '1s', while the absence of reflected radar signals from the second regions may convey binary '0s'. Note that the pattern of the set of radar reflectors 128 may be one dimensional (e.g., the set of radar reflectors 128 may be arranged along a line, such as in a linear array) or, as illustrated in FIG. 1, two dimensional (e.g., the set of radar reflectors 128 may be arranged in a plane).

In this way, identification device 116 may facilitate passive identification, tracking, and/or the conveying of information about an object that includes identification device 116. For example, in addition to identification information, the pattern may correspond to a shipping manifest (such as a source or destination), cargo contents, information associated with a Department of Transportation hazardous material placard, etc.

Figure 2:
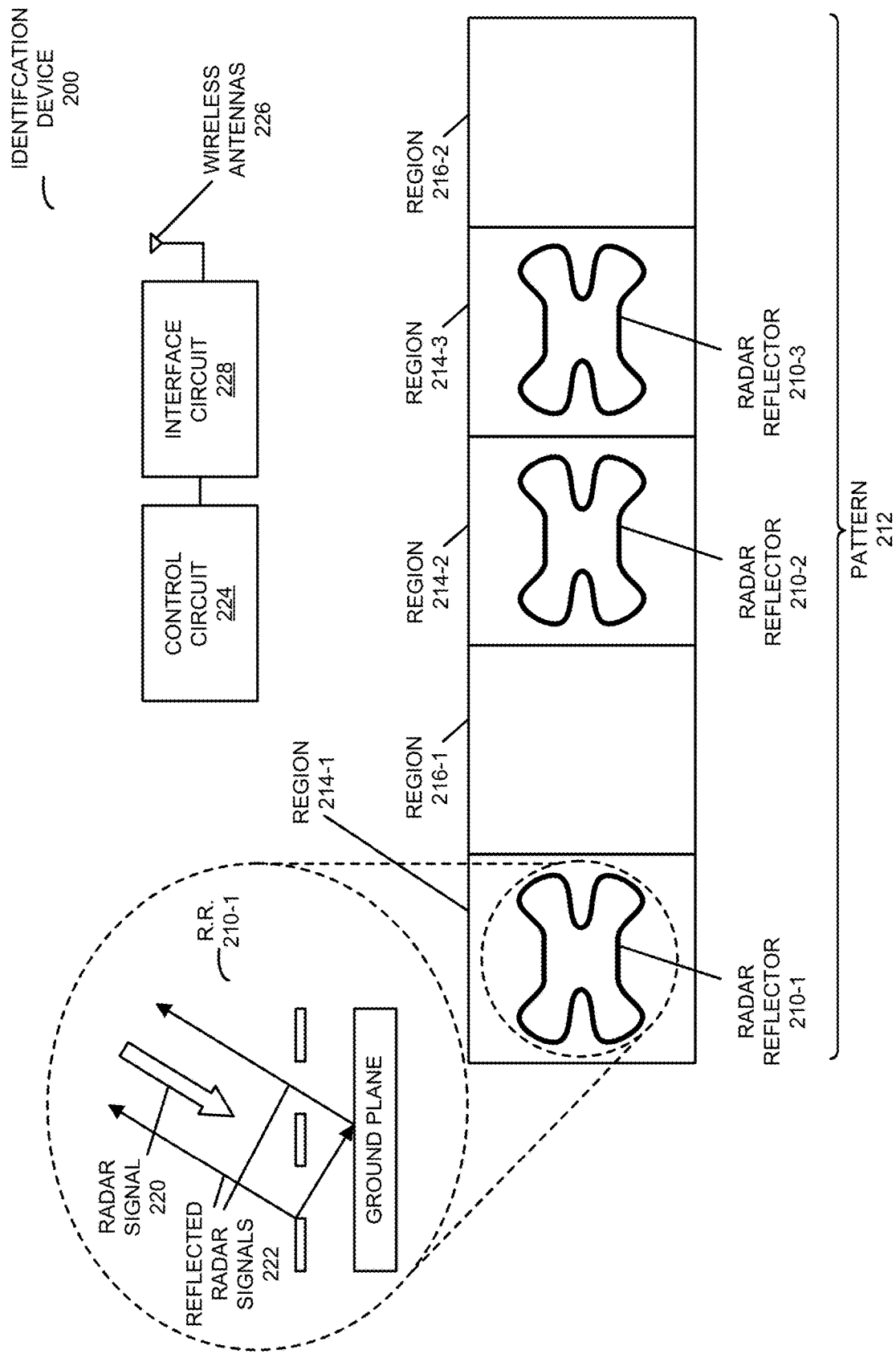
FIG. 2 is a drawing illustrating an example of views of an identification device in FIG. 1 in accordance with an embodiment of the present disclosure.
Figure 3:
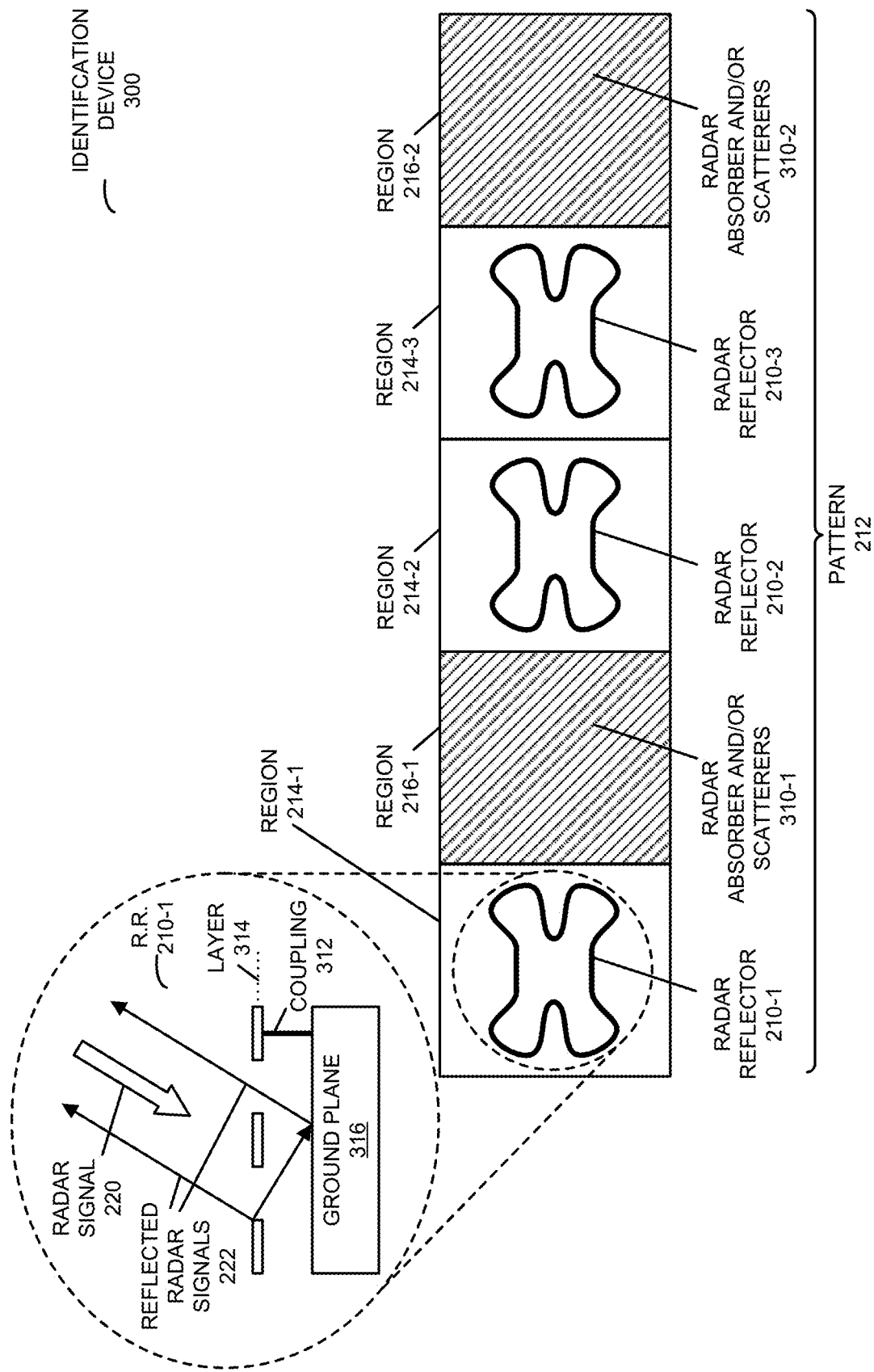
FIG. 3 is a drawing illustrating an example of views of an identification device in FIG. 1 in accordance with an embodiment of the present disclosure.

FIG. 2 presents a drawing illustrating a front view of an example of an identification device 200, which may be an example of identification device 116 (FIG. 1). Identification device 200 may include a set of radar reflectors 210 that reflect radar signals 112 (FIG. 1) having the fundamental wavelength. The set of radar reflectors 210 may be arranged in a pattern 212 corresponding to the identification information. This pattern may include regions 214 that reflect radar signals and regions 216 that do not reflect or scatter radar signals. For example, regions 214 may each include a radar reflector in the set of radar reflectors 210 (such as a square radar reflector, e.g., 2×2 in$^2$), and regions 216 each may not include or may exclude a radar reflector in the set of radar reflectors 210 (i.e., there may be an absence of a radar reflector or a null in each of regions 216).

Moreover, as shown in the inset, which presents a side view of one of the set of radar reflectors 210 in identification device 200, the set of radar reflectors 210 may be retrodirective, where a given radar reflector (R. R.) reflects a radar signal 220 back along its prior direction of propagation as reflected radar signals 222. In some embodiments, the set of radar reflector 210 may include passive antennas.

In some embodiments, other techniques may be used to implement regions 216 that do not reflect or scatter radar signals (and, thus, that help to create pattern 212 or the spatial modulation of the reflected radar signals provided by the embodiments identification device). As shown in FIG. 3, which presents a drawing illustrating a front view of an example of an identification device 300 (and which may be an example of identification device 116 in FIG. 1), regions 216 may include radar absorbers 310 (such as a material that absorbs radar signals at the fundamental wavelength). In some embodiments regions 216 do scatter the radar signals. For example, regions 216 may include radar scatterers instead of or in addition to radar absorbers 310. Alternatively or additionally, regions 216 may, at least in part, be coupled to ground. For example, as shown in the inset, which presents a side view of one of the set of radar reflectors 210 in identification device 300, coupling 312 a layer 314 (such as a metal layer) in a radar reflector 210-1 to ground plane 316 may at least partially disable radar reflector 210-1.

Figure 4:
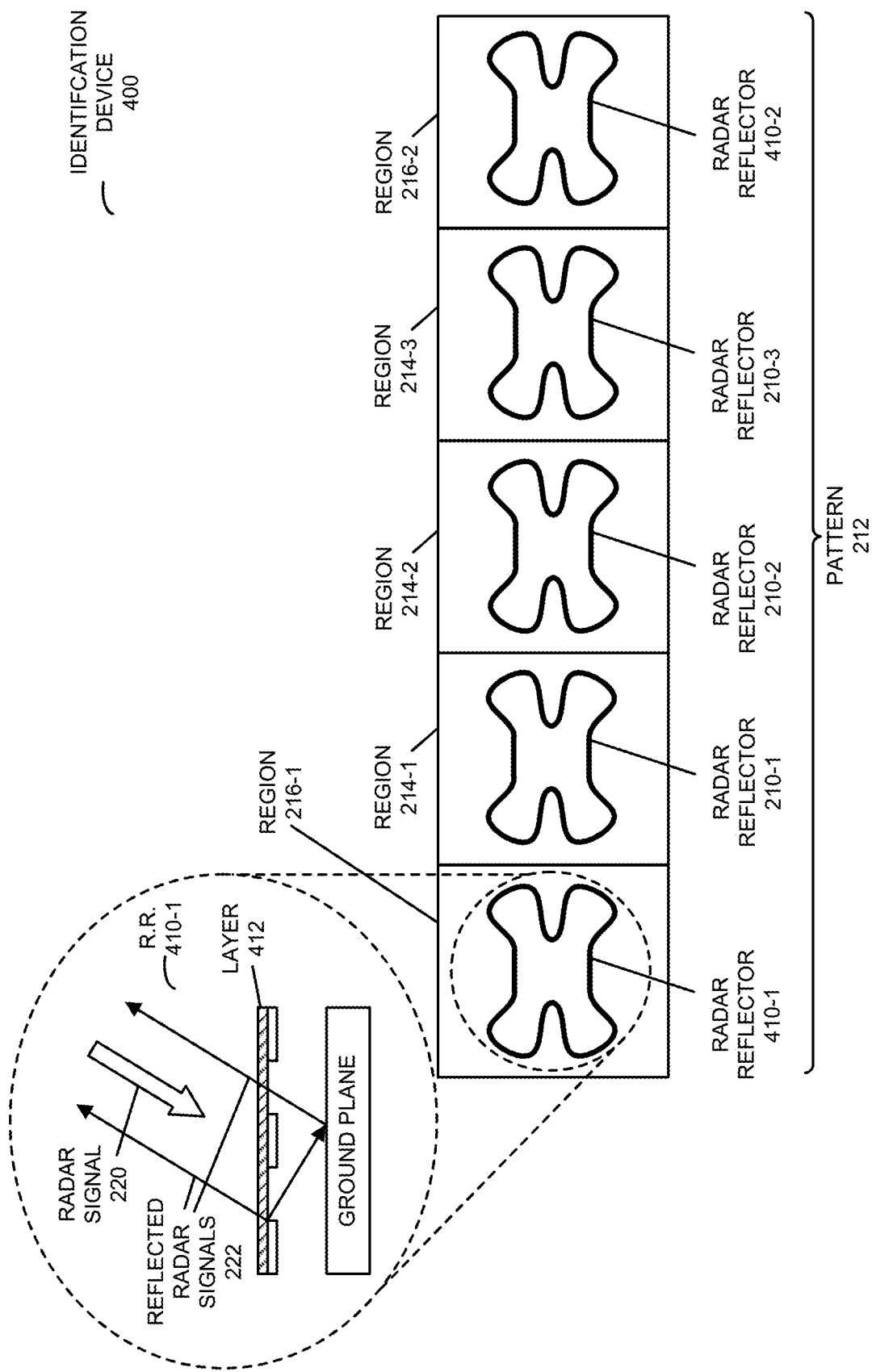
FIG. 4 is a drawing illustrating an example of views of an identification device in FIG. 1 in accordance with an embodiment of the present disclosure.

Furthermore, as shown in FIG. 4, which presents a drawing illustrating an example of a front view of an identification device 400 (and which may be an example of identification device 116 in FIG. 1), regions 216 may include radar reflectors in a second set of radar reflectors 410. The second set of radar reflectors 410 may reflect radar signals having a second fundamental wavelength that is different from the fundamental wavelength. For example, as shown in the inset, which presents a side view of one of the set of radar reflectors 410 in identification device 400, the second set of radar reflectors 410 may include a material 412 (such as a plastic film or layer) that detunes the second fundamental wavelength from the fundamental wavelength. Notably, material 412 may change an impedance of the second set of radar reflectors, such as an impedance of radar reflector 410-1.

In some embodiments, pattern 212 is static. However, in other embodiments, pattern may be dynamically configured or adjusted. Referring back to FIG. 2, in some embodiments identification device 222 may optionally include a control circuit 224 (such as an integrated circuit and/or a processor) that provides electrical signals to the set of radar reflectors 210 (via one or more signal lines or connectors, which are not shown) to dynamically configure the set of radar reflectors 210 to have pattern 212. For example, in response to the electrical signals, one or more of the set of radar reflectors 210 may be selectively enabled or disabled, such as by selectively coupling at least a portion of the set of radar reflectors 210 (such as a metal layer) to ground.

Moreover, in some embodiments, pattern 212 may optionally be remotely configured (such as by electronic device 110 in FIG. 1) using wireless communication. For example, identification device 200 may include: one or more wireless antennas 226; and an interface circuit 228 that wirelessly communicates with another electronic device (such as with radio 124 and one or more wireless antennas 126 in electronic device 110 in FIG. 1). During operation, identification device 200 may: receive, via interface circuit 228 and the one or more wireless antennas 226, information that specifies pattern 212. In response, interface circuit 228 may provide pattern 212 (or electrical signals that specify pattern 212) to control circuit 224 (via one or more signal lines or connectors, not shown), so that control circuit 224 can dynamically configure the set of radar reflectors 210.

The set of radar reflectors 210, the transmit antennas 120 (FIG. 1) and/or the receive antennas 122 (FIG. 2) may include single or multiple radiators. In general, the set of radar reflectors 210, the transmit antennas 120 and/or the receive antennas 122 may have the same or different sizes. Moreover, the set of radar reflectors 210, the transmit antennas 120 and/or the receive antennas 122 may incorporate the same or different number and/or configurations of radiators.

Furthermore, the set of radar reflectors 210, the transmit antennas 120 and the receive antennas 122 may be implemented using a wide variety of antenna structures and fabrication techniques, including multi-layer printed circuit board antennas with: microstrip feed lines and patch radiators (such as patch radiators with Koch and Sierpinski fractal shapes), electromagnetic band-gap structures, substrate integrated waveguide (SIW) feed lines and SIW slotted radiators, coplanar waveguide feed lines with SIW slotted radiators and/or other types of feed and radiator structures. In some embodiments, the set of radar reflectors 210, the transmit antennas 120 and/or the receive antennas 122 include high-gain antennas.

In some embodiments, the transmit antennas 120 have 6-30 dB gain, a beam width between a few degrees and 180°, a transmit power of up to 12 dBm, and an effective range of 200-250 m.

In some embodiments, the transmit antennas 120 may include 12 transmit antennas arranged along a horizontal (azimuth) and a vertical (elevation) directions. Moreover, the receive antennas 122 may include 16 receive antennas arranged along the horizontal and vertical directions. Consequently, in embodiments that have a MIMO operating mode, there may be 12×16 or 192 pairs. However, these numerical values are for illustrative purposes, and in other embodiments different numerical values may be used.

Moreover, while electronic device 110 (FIG. 1) is illustrated with one or more transceivers 118 (FIG. 1), in other embodiments the one or more transceivers 118 may be replaced with one or more transmitters and one or more receivers (i.e., separate transmit and receive components).

While processing the received reflected radar signals, electronic device 110 may perform additional operations to extract or determine information (such as the identification information). For example, electronic device 110 may perform windowing or filtering, one or more Fourier or discrete Fourier transforms (with at least 128 or 256 bits), peak detection, etc. In some embodiments, a constant false alarm rate (CFAR) technique is used to identify or determine whether a peak in the received reflected radar signals 114 (FIG. 1) is significant. Notably, electronic device 110 may calculate statistical metrics (such as a mean and a standard deviation) for a given range, and electronic device 110 may determine if a given peak is significant based on the calculated statistical metrics at different ranges. This approach may allow electronic device 110 to statistically identify or determine information associated with an object (such as identification device 116 in FIG. 1).

Moreover, electronic device 110 may extract a signature associated with the object from the received reflected radar signals 114. The resulting signature of the object may include multiple dimensions. For example, the signature may include one or more of: a range to the object (such as time-of-flight information), a first angle to the object along a first axis (such as the horizontal or azimuth direction), Doppler information associated with the object (such as velocity information) and/or a second angle to the object along a second axis (such as the vertical or elevation direction). Some or all of this information may be stored locally in electronic device 110 and/or remotely in a computer-readable memory.

Figure 5:
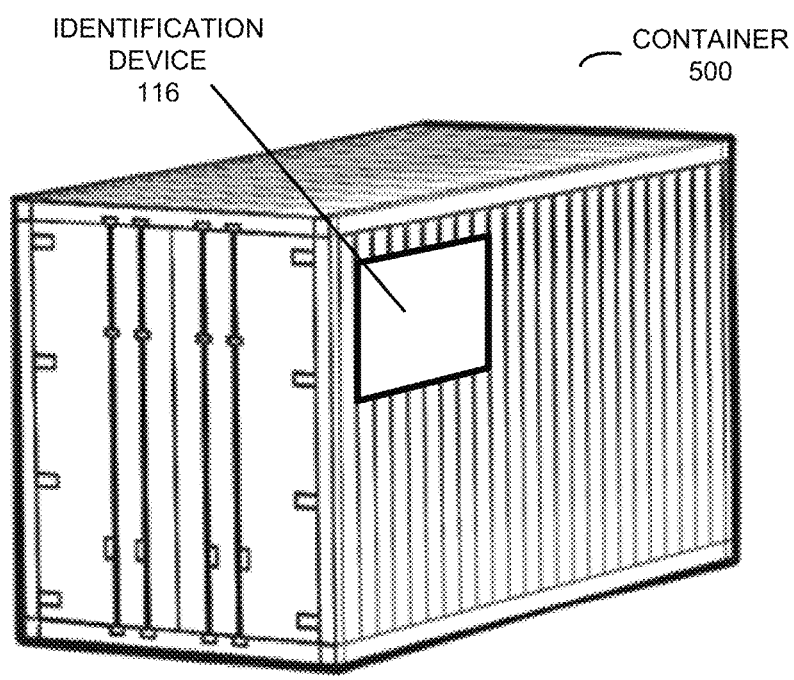
FIG. 5 is a drawing illustrating an example of a container that includes an identification device of FIG. 1 in accordance with an embodiment of the present disclosure.

The identification device may be used in a wide variety of application. For example, as noted previously, one or more embodiments or instances of the identification device may be included in a container. This is shown in FIG. 5, which presents a drawing illustrating an example of a container 500 that includes identification device 116. For example, the identification information provided by identification device 116 may be used to track the container 500 or its contents, to facilitate supply chain management, just-in-time delivery, management of a port or a warehouse (such as loading of a ship or a truck), operation of a robot in a manufacturing facility (such as a factory), security, etc.

More generally, one or more embodiments or instances of the identification device may be included in: a vehicle (such as a car or automobile, a truck, a bus, a train, etc. and more generally one that includes one or more non-retractable wheels in contact with a surface, e.g., a road or the ground, during operation), a building, a package, an object, etc. to facilitate identification, tracking and/or conveying of information. For example, during operation of a vehicle, the identification information provided by embodiments or instances of the identification device may facilitate: object detection, adaptive cruise control, an Advanced Driver Assistance System (ADAS), a safety function (such as forward and side collision warning and avoidance), automated parking, partial autonomous driving functions (such as a traffic jam pilot or a highway pilot) and/or fully autonomous driving.

Because the identification device may be radar-based, in some embodiments the identification device can be included below the surface of an object that includes the identification device or may not be visible to a viewer standing outside of the object. However, in embodiments where the identification technique is used with visible light, the identification device may be mounted on a surface of an object and may include (separately or in conjunction with the set of radar reflectors) a visible pattern (such as a bar code or a QR code).

In some embodiments, electronic device 110, identification 116 and/or container 500 includes fewer or additional components, two or more components are combined into a single component and/or positions of one or more components are changed. For example, while container 500 is illustrated with a single identification device 116, in some embodiments there may be two or more identification devices (such as identification devices on different surfaces of container 500).

Figure 6:
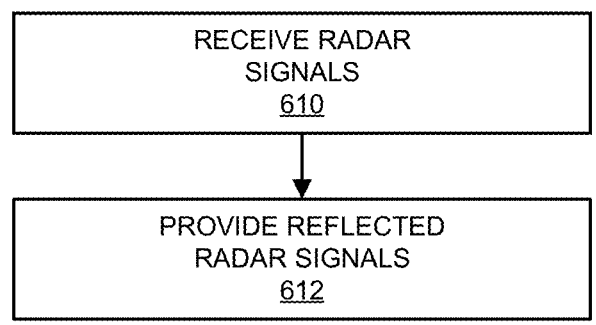
FIG. 6 is a flow diagram illustrating an example of a method for providing identification information in accordance with an embodiment of the present disclosure.

FIG. 6 presents a flow diagram illustrating an example of a method 600 for providing identification information. This method may be performed by an identification device (such as identification device 116 in FIG. 1). During operation, the identification device may receive radar signals (operation 610) having a fundamental wavelength. Then, the identification device may selectively reflect the radar signals (operation 612) using a set of radar reflectors arranged in a pattern corresponding to the identification information. The set of radar reflectors may be retrodirective, where a given radar reflector reflects a radar signal back along its prior direction of propagation. Moreover, the pattern may include regions that reflect the radar signals and second regions that do not reflect or scatter the radar signals.

Figure 7:
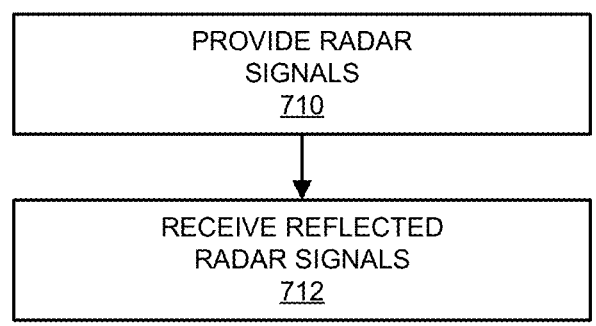
FIG. 7 is a flow diagram illustrating an example of a method for receiving identification information in accordance with an embodiment of the present disclosure.

FIG. 7 presents a flow diagram illustrating an example of a method 700 for receiving identification information. This method may be performed by an electronic device (such as electronic device 110 in FIG. 1) or a component in the electronic device (such as an integrated circuit or a processor). During operation, the electronic device may provide radar signals (operation 710) having a fundamental wavelength. Then, the electronic device may receive reflected radar signals (operation 712) that convey the identification information. These reflected radar signals may be received from an identification device that includes a set of radar reflectors arranged in a pattern corresponding to the identification information. The set of radar reflectors may be retrodirective, where a given radar reflector reflects a radar signal back along its prior direction of propagation. Moreover, the pattern may include regions that reflect the radar signals and second regions that do not reflect or scatter the radar signals.

In some embodiments of method 600 (FIG. 6) and/or 700 there may be additional or fewer operations. Moreover, the order of the operations may be changed, and/or two or more operations may be combined into a single operation.

Figure 8:
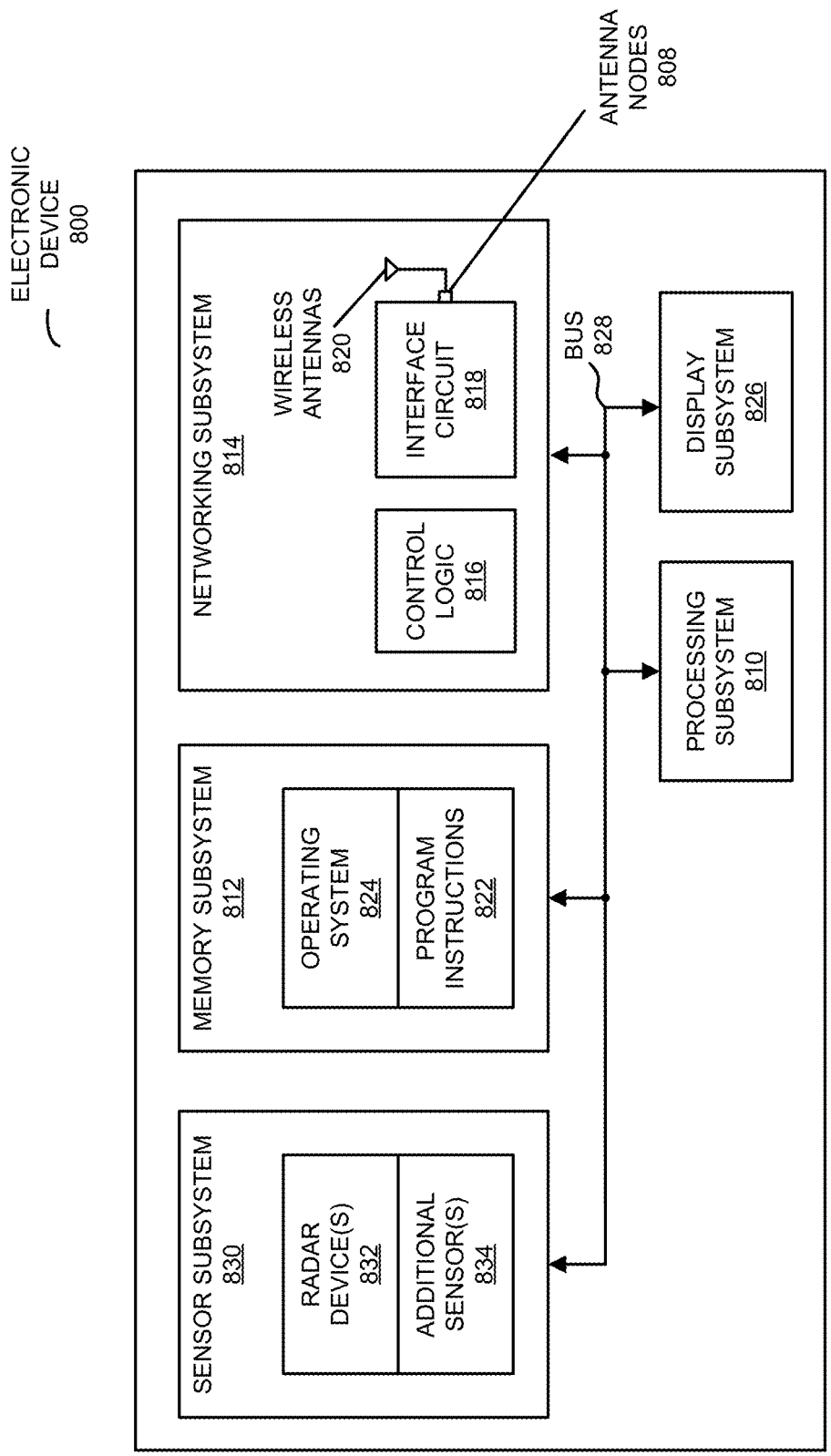
FIG. 8 is a block diagram illustrating an example of an electronic device in accordance with an embodiment of the present disclosure.

We now describe embodiments of an electronic device, which may perform at least some of the operations in the identification technique. FIG. 8 presents a block diagram illustrating an example of an electronic device 800, such as electronic device 110 (FIG. 1) or identification device 116 (FIG. 1). This electronic device may include processing subsystem 810, memory subsystem 812, networking subsystem 814 and sensor subsystem 830. Processing subsystem 810 includes one or more devices configured to perform computational operations. For example, processing subsystem 810 can include one or more microprocessors, ASICs, microcontrollers, programmable-logic devices, graphical processor units (GPUs) and/or one or more digital signal processors (DSPs).

Memory subsystem 812 includes one or more devices for storing data and/or instructions for processing subsystem 810 and networking subsystem 814. For example, memory subsystem 812 can include dynamic random access memory (DRAM), static random access memory (SRAM), and/or other types of memory (which collectively or individually are sometimes referred to as a 'computer-readable storage medium'). In some embodiments, instructions for processing subsystem 810 in memory subsystem 812 include: one or more program modules or sets of instructions (such as program instructions 822 or operating system 824), which may be executed by processing subsystem 810. Note that the one or more computer programs may constitute a computer-program mechanism. Moreover, instructions in the various modules in memory subsystem 812 may be implemented in: a high-level procedural language, an object-oriented programming language, and/or in an assembly or machine language. Furthermore, the programming language may be compiled or interpreted, e.g., configurable or configured (which may be used interchangeably in this discussion), to be executed by processing subsystem 810.

In addition, memory subsystem 812 can include mechanisms for controlling access to the memory. In some embodiments, memory subsystem 812 includes a memory hierarchy that comprises one or more caches coupled to memory in electronic device 800. In some of these embodiments, one or more of the caches is located in processing subsystem 810.

In some embodiments, memory subsystem 812 is coupled to one or more high-capacity mass-storage devices (not shown). For example, memory subsystem 812 can be coupled to a magnetic or optical drive, a solid-state drive, or another type of mass-storage device. In these embodiments, memory subsystem 812 can be used by electronic device 800 as fast-access storage for often-used data, while the mass-storage device is used to store less frequently used data.

Networking subsystem 814 includes one or more devices configured to couple to and communicate on a wired and/or wireless network (i.e., to perform network operations), including: control logic 816, an interface circuit 818 and one or more wireless antennas 820 (or antenna elements). (While FIG. 8 includes one or more wireless antennas 820, in some embodiments electronic device 800 includes one or more nodes, such as nodes 808, e.g., a pad, which can be coupled to the one or more wireless antennas 820. Thus, electronic device 800 may or may not include the one or more wireless antennas 820.) For example, networking subsystem 814 can include a Bluetooth networking system, a cellular networking system (e.g., a 3G/4G network such as UMTS, LTE, etc.), a USB networking system, a networking system based on the standards described in IEEE 802.11 (e.g., a Wi-Fi networking system), an Ethernet networking system, and/or another networking system.

Note that a transmit or receive antenna pattern (or antenna radiation pattern) of electronic device 800 may be adapted or changed using pattern shapers (such as reflectors) in one or more wireless antennas 820 (or antenna elements), which can be independently and selectively electrically coupled to ground to steer the transmit antenna pattern in different directions. (Alternatively or additionally, the transmit or receive antenna pattern may be adapted or changed using a phased array.) Thus, if one or more wireless antennas 820 include N antenna pattern shapers, the one or more antennas may have $2^N$ different antenna pattern configurations. More generally, a given antenna pattern may include amplitudes and/or phases of signals that specify a direction of the main or primary lobe of the given antenna pattern, as well as so-called 'exclusion regions' or 'exclusion zones' (which are sometimes referred to as 'notches' or 'nulls'). Note that an exclusion zone of the given antenna pattern includes a low-intensity region of the given antenna pattern. While the intensity is not necessarily zero in the exclusion zone, it may be below a threshold, such as 3 dB or lower than the peak gain of the given antenna pattern. Thus, the given antenna pattern may include a local maximum (e.g., a primary beam) that directs gain in the direction of electronic device 800 that is of interest, and one or more local minima that reduce gain in the direction of other electronic devices that are not of interest. In this way, the given antenna pattern may be selected, e.g., to target an object of interest in an environment of electronic device 800.

Networking subsystem 814 includes processors, controllers, radios/antennas, sockets/plugs, and/or other devices used for coupling to, communicating on, and handling data and events for each supported networking system. Note that mechanisms used for coupling to, communicating on, and handling data and events on the network for each network system are sometimes collectively referred to as a 'network interface' for the network system. Moreover, in some embodiments a 'network' or a 'connection' between the electronic devices does not yet exist. Therefore, electronic device 800 may use the mechanisms in networking subsystem 814 for performing simple wireless communication between the electronic devices, e.g., transmitting frames and/or scanning for frames transmitted by other electronic devices.

Within electronic device 800, processing subsystem 810, memory subsystem 812, and networking subsystem 814 are coupled together using bus 828. Bus 828 may include an electrical, optical, and/or electro-optical connection that the subsystems can use to communicate commands and data among one another. Although only one bus 828 is shown for clarity, different embodiments can include a different number or configuration of electrical, optical, and/or electro-optical connections among the subsystems.

In some embodiments, electronic device 800 includes an optional display subsystem 826 for displaying information on a display, which may include a display driver and the display, such as a liquid-crystal display, a multi-touch touchscreen, etc.

Furthermore, electronic device 800 may include a sensor subsystem 830, which may include one or more radar devices 832 with one or more transmitters, one or more receivers, one or more sets of transmit antennas and/or one or more sets of receive antennas that perform radar measurements or that provide reflected radar signals corresponding to identification information. In some embodiments, sensor subsystem 830 includes one or more image sensors that acquire images (such as a CCD or a CMOS sensor) and/or one or more additional sensors 834 (such as a light-intensity sensor, radar, sonar, lidar, etc.). These other or additional sensors may be used separately or in conjunction with the one or more radar devices 832.

Electronic device 800 can be (or can be included in) a wide variety of electronic devices. For example, electronic device 800 can be (or can be included in): a desktop computer, a laptop computer, a subnotebook/netbook, a server, a computer, a mainframe computer, a cloud-based computer, a tablet computer, a smartphone, a cellular telephone, a smartwatch, a consumer-electronic device, a portable computing device, a transceiver, an identification device, a measurement device, another electronic device, a container, a building, a package and/or a vehicle.

Although specific components are used to describe electronic device 800, in alternative embodiments, different components and/or subsystems may be present in electronic device 800. For example, electronic device 800 may include one or more additional processing subsystems, memory subsystems, networking subsystems, display subsystems and/or sensor subsystems. Additionally, one or more of the subsystems may not be present in electronic device 800. Moreover, in some embodiments, electronic device 800 may include one or more additional subsystems that are not shown in FIG. 8. Also, although separate subsystems are shown in FIG. 8, in some embodiments some or all of a given subsystem or component can be integrated into one or more of the other subsystems or component(s) in electronic device 800. For example, in some embodiments program instructions 822 are included in operating system 824 and/or control logic 816 is included in interface circuit 818.

Moreover, the circuits and components in electronic device 800 may be implemented using any combination of analog and/or digital circuitry, including: bipolar, PMOS and/or NMOS gates or transistors. Furthermore, signals in these embodiments may include digital signals that have approximately discrete values and/or analog signals that have continuous values. Additionally, components and circuits may be single-ended or differential, and power supplies may be unipolar or bipolar.

An integrated circuit (which is sometimes referred to as a 'communication circuit' or a 'means for communication') may implement some or all of the functionality of networking subsystem 814 or sensor subsystem 830. The integrated circuit may include hardware and/or software mechanisms that are used for transmitting wireless or radar signals from electronic device 800 and receiving wireless or radar signals at electronic device 800 from other electronic devices. Aside from the mechanisms herein described, radios are generally known in the art and hence are not described in detail. In general, networking subsystem 814 and/or the integrated circuit can include any number of radios. Note that the radios in multiple-radio embodiments function in a similar way to the described single-radio embodiments.

In some embodiments, networking subsystem 814 and/or the integrated circuit include a configuration mechanism (such as one or more hardware and/or software mechanisms) that configures the radio(s) to transmit and/or receive on a given communication channel (e.g., a given carrier frequency). For example, in some embodiments, the configuration mechanism can be used to switch the radio from monitoring and/or transmitting on a given communication channel to monitoring and/or transmitting on a different communication channel. (Note that 'monitoring' as used herein comprises receiving signals from other electronic devices and possibly performing one or more processing operations on the received signals)

Moreover, another integrated circuit may implement some or all of the functionality related to the measurement technique.

In some embodiments, an output of a process for designing a given integrated circuit, or a portion of the given integrated circuit, which includes one or more of the circuits described herein may be a computer-readable medium such as, for example, a magnetic tape or an optical or magnetic disk. The computer-readable medium may be encoded with data structures or other information describing circuitry that may be physically instantiated as the given integrated circuit or the portion of the given integrated circuit. Although various formats may be used for such encoding, these data structures are commonly written in: Caltech Intermediate Format (CIF), Calma GDS II Stream Format (GDSII) or Electronic Design Interchange Format (EDIF). Those of skill in the art of integrated circuit design can develop such data structures from schematics of the type detailed above and the corresponding descriptions and encode the data structures on the computer-readable medium. Those of skill in the art of integrated circuit fabrication can use such encoded data to fabricate integrated circuits that include one or more of the circuits described herein.

While some of the operations in the preceding embodiments were implemented in hardware or software, in general the operations in the preceding embodiments can be implemented in a wide variety of configurations and architectures. Therefore, some or all of the operations in the preceding embodiments may be performed in hardware, in software or both. For example, at least some of the operations in the measurement technique may be implemented using program instructions 822, operating system 824 (such as a driver for interface circuit 818) or in firmware in interface circuit 818. Alternatively or additionally, at least some of the operations in the measurement technique may be implemented in a physical layer, such as hardware in interface circuit 818 or sensor subsystem 830.

While some of the preceding embodiments illustrated the use of the identification device in a vehicle, such as a car, a truck, a bus, etc., in other embodiments the identification technique is used in conjunction with a flying vehicle (such as a drone, a helicopter, an airplane, etc.), a boat or a ship, and/or a submersible vehicle (such as a drone or a submarine).

In the preceding description, we refer to 'some embodiments.' Note that 'some embodiments' describes a subset of all of the possible embodiments, but does not always specify the same subset of embodiments. Note that numerical values in the preceding embodiments are illustrative examples of some embodiments. In other embodiments of the identification technique, different numerical values may be used.

The foregoing description is intended to enable any person skilled in the art to make and use the disclosure, and is provided in the context of a particular application and its requirements. Moreover, the foregoing descriptions of embodiments of the present disclosure have been presented for purposes of illustration and description only. They are not intended to be exhaustive or to limit the present disclosure to the forms disclosed. Accordingly, many modifications and variations will be apparent to practitioners skilled in the art, and the general principles defined herein may be applied to other embodiments and applications without departing from the spirit and scope of the present disclosure. Additionally, the discussion of the preceding embodiments is not intended to limit the present disclosure. Thus, the present disclosure is not intended to be limited to the embodiments shown, but is to be accorded the widest scope consistent with the principles and features disclosed herein.

What is claimed is:

1. An identification device, comprising:
a set of radar reflectors configured to reflect radar signals having a fundamental wavelength, wherein the set of radar reflectors are arranged in a pattern corresponding to identification information,
wherein the set of radar reflectors are retrodirective,
wherein a given radar reflector is configured to reflect a radar signal back along its prior direction of propagation,
wherein the pattern includes regions configured to reflect the radar signals and second regions that are configured to not reflect or scatter the radar signals; and
a control circuit, communicatively coupled to the set of radar reflectors, configured to provide electrical signals that dynamically configure the pattern.

2. The identification device of claim 1, wherein the set of radar reflectors comprise passive antennas.

3. The identification device of claim 1, wherein the regions include radar reflectors in the set of radar reflectors and the second regions exclude the radar reflectors.

4. The identification device of claim 1, wherein the regions include radar reflectors in the set of radar reflectors and the second regions include radar absorbers.

5. The identification device of claim 1, wherein the regions include radar reflectors in the set of radar reflectors and the second regions are electrically coupled to ground.

6. The identification device of claim 1, wherein the regions include radar reflectors in the set of radar reflectors and second regions include radar reflectors in a second set of radar reflectors; and
wherein the second set of radar reflectors are configured to reflect radar signals having a second fundamental wavelength that is different from the fundamental wavelength.

7. The identification device of claim 6, wherein the second set of radar reflectors comprise a material that detunes the second fundamental wavelength from the fundamental wavelength.

8. The identification device of claim 7, wherein the material is configured to change an impedance of the second set of radar reflectors.

9. The identification device of claim 1, wherein the pattern is one dimensional.

10. The identification device of claim 1, wherein the pattern is two dimensional.

11. The identification device of claim 1, wherein the identification device comprises:
an antenna; and
an interface circuit, communicatively coupled to the antenna, configured to wirelessly communicate with another electronic device; and
wherein the identification device is configured to:
receive, via the interface circuit and the antenna, information that specifies the pattern; and
provide the pattern to the control circuit.

12. The identification device of claim 1, wherein the pattern is static.

13. A container, comprising an identification device, wherein the identification device comprises:
a set of radar reflectors configured to reflect radar signals having a fundamental wavelength, wherein the set of radar reflectors are arranged in a pattern corresponding to identification information,
wherein the set of radar reflectors are retrodirective,
wherein a given radar reflector is configured to reflect a radar signal back along its prior direction of propagation,
wherein the pattern includes regions configured to reflect the radar signals and second regions that are configured to not reflect or scatter the radar signals; and
a control circuit, communicatively coupled to the set of radar reflectors, configured to provide electrical signals that dynamically configure the pattern.

14. The container of claim 13, wherein the regions include radar reflectors in the set of radar reflectors and the second regions exclude the radar reflectors.

15. The container of claim 13, wherein the regions include radar reflectors in the set of radar reflectors and the second regions include radar absorbers.

16. The container of claim 13, wherein the regions include radar reflectors in the set of radar reflectors and second regions include radar reflectors in a second set of radar reflectors; and
wherein the second set of radar reflectors are configured to reflect radar signals having a second fundamental wavelength that is different from the fundamental wavelength.

17. The container of claim 13, wherein the identification device comprises:
an antenna; and
an interface circuit, communicatively coupled to the antenna, configured to wirelessly communicate with another electronic device; and
wherein the identification device is configured to:
receive, via the interface circuit and the antenna, information that specifies the pattern; and
provide the pattern to the control circuit.

18. A method for providing identification information, comprising:
by an identification device:
providing, from a control circuit in the identification device, electrical signals to a set of radar reflectors to dynamically configure a pattern corresponding to the identification information;
receiving radar signals having a fundamental wavelength; and
selectively reflecting the radar signals using the set of radar reflectors arranged in the pattern,
wherein the set of radar reflectors are retrodirective,
wherein a given radar reflector is configured to reflect a radar signal back along its prior direction of propagation, and
wherein the pattern includes regions that reflect the radar signals and second regions that do not reflect or scatter the radar signals.

19. The method of claim 18, wherein the regions include radar reflectors in the set of radar reflectors and second regions include radar reflectors in a second set of radar reflectors; and
wherein the second set of radar reflectors are configured to reflect radar signals having a second fundamental wavelength that is different from the fundamental wavelength.

20. The method of claim 18, wherein the method comprises:
  receiving, using an interface circuit and an antenna in the identification device, information that specifies the pattern, wherein the information is received via wireless communication; and
  providing the pattern to the control circuit.

* * * * *